United States Patent [19]
Schwab et al.

[11] Patent Number: 5,182,127
[45] Date of Patent: Jan. 26, 1993

[54] MICROWAVE TEMPERING OF COOKED CEREAL PELLETS OR PIECES

[75] Inventors: Edward C. Schwab, New Brighton; George E. Brown, Edina, both of Minn.

[73] Assignee: General Mills, Inc., Minneapolis, Minn.

[21] Appl. No.: 764,288

[22] Filed: Sep. 23, 1991

[51] Int. Cl.$^5$ .................. A23L 1/00; A21D 15/00
[52] U.S. Cl. .................. 426/241; 426/242; 426/620; 426/621; 426/808
[58] Field of Search ............. 426/241, 242, 620, 621, 426/622, 808, 94

[56] References Cited

U.S. PATENT DOCUMENTS

| | | | |
|---|---|---|---|
| 3,620,764 | 11/1971 | Watkins | 426/241 |
| 3,682,651 | 8/1972 | McAlister | 426/242 |
| 3,904,429 | 9/1975 | Eastman et al. | 426/241 |
| 3,908,029 | 9/1975 | Fredrickson | 426/242 |
| 4,251,551 | 2/1981 | Van Hulle et al. | 426/242 |
| 4,342,788 | 8/1982 | Clatfelter | 426/243 |
| 4,409,250 | 10/1983 | Van Hulle et al. | 426/242 |
| 4,413,018 | 11/1983 | Webster | 426/618 |
| 4,608,261 | 8/1986 | MacKenzie | 426/242 |
| 4,650,681 | 3/1987 | Greethead | 426/622 |
| 4,800,090 | 1/1989 | August | 426/243 |
| 4,803,090 | 2/1989 | Schlipalius et al. | 426/242 |
| 4,808,782 | 2/1989 | Nakagawa et al. | 426/241 |
| 4,940,593 | 7/1990 | Duffy | 426/621 |
| 5,035,913 | 7/1991 | Sky | 426/620 |
| 5,102,679 | 4/1992 | Whalen | 426/243 |

FOREIGN PATENT DOCUMENTS

| | | |
|---|---|---|
| 0072878 | 3/1983 | European Pat. Off. |
| 0312363 | 4/1989 | European Pat. Off. |
| 0375006 | 6/1990 | European Pat. Off. |
| 2458226 | 2/1981 | France |
| 2055285 | 3/1981 | United Kingdom |
| 2193619A | 2/1988 | United Kingdom |

OTHER PUBLICATIONS

"Snack, crackle pop!" Food Manufacture, Mar., 1990 pp. 37–38.
"Breakfast Cereals and How They Are Made" by Fast and Caldwell, Amer. Assn. of Cereal Chemists, Inc., (1991) pp. 109–113, 25, 27, 34, 36, 38, 40 & 100.
"Technology of Cereals" 3rd Ed., by N. L. Kent, Pergamon Press (1983), pp. 144–146.
"Extrusion of Foods," vol. II by Judson M. Harper, CRC Press, Inc. (1981), pp. 78–85.
"Principles of Cereal Science and Technology" by R. Carl Hoseney, Amer. Assn. of Cereal Chemists, Inc. (1986), pp. 296–302.
"Cereal Technology" by Samuel A. Matz, The AVI Publishing Co., Inc. (1970), pp. 226–237.

*Primary Examiner*—George Yeung
*Attorney, Agent, or Firm*—John A. O'Toole

[57] ABSTRACT

A method for tempering cooked cereal pellets or pieces for ready-to-eat cereals or cereal based snack half product is provided. The method involves the step of exposing the cereal pellets or pieces to a high intensity microwave field for a brief time sufficient to improve moisture distribution therein but without causing the pellets or pieces to puff. A high intensity microwave field has a field strength of >90 V/cm in free space. Exposure times range from about 15 to 30 seconds depending upon the initial temperature and moisture content of the pellets. The microwave tempered cereal pellets or cereal based snack half products can thereafter be conventionally processed to form finished cereal products. The finished cereal products exhibit superior physical and organoleptic attributes such as volume, improved texture, uniformity and for R-T-E cereal embodiments, also longer bowl life.

35 Claims, 1 Drawing Sheet

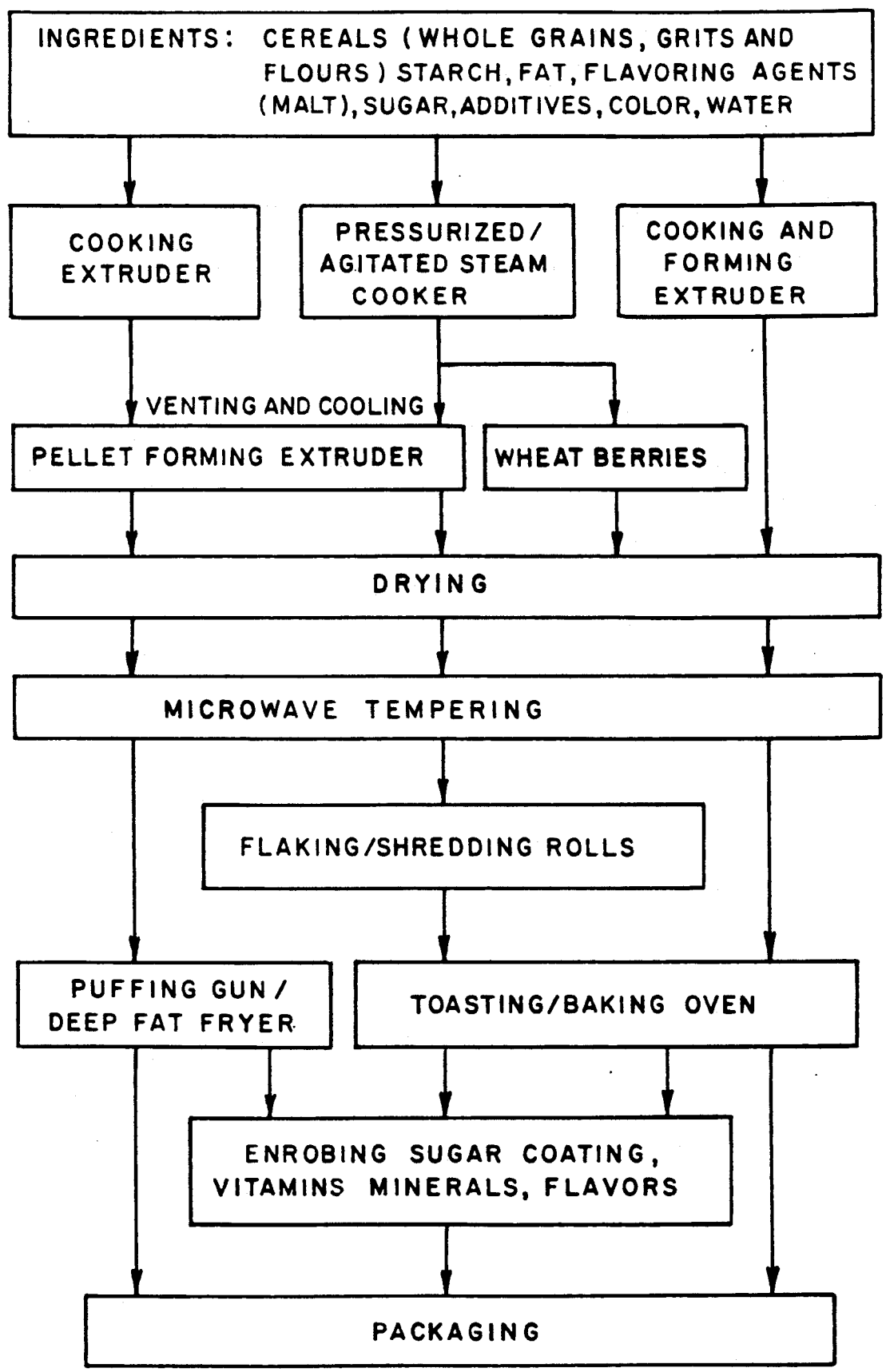

MICROWAVE TEMPERING OF COOKED CEREAL PELLETS OR PIECES

FIELD OF THE INVENTION

The present invention relates to food products and to their methods of preparation. More particularly, the present invention relates to a microwave tempering of cereal pellets useful in the preparation of R-T-E cereals and puffed snack products.

BACKGROUND

Cereal products are popular food items especially Ready-To-Eat ("R-T-E") breakfast cereals and snack products. Preparation of finished cereal products generally involves, at some point during manufacture, the preparation of cereal pellets from a cooked cereal dough or further processing of pieces of cooked cereal materials.

For example, in the preparation of unpuffed R-T-E cereals, cereal pellets are formed and the pellets are then flaked, shredded or otherwise shaped prior to toasting, baking or other finishing steps. In the preparation of puffed R-T-E cereals, cereal pellets are formed, dried and then gun puffed or fluid bed puffed with hot air. Cereal based snack products are generally similarly processed except that the unpuffed cereal pellets are puffed or expanded by deep fat frying. In the production of a shredded wheat R-T-E cereal, cooked whole wheat berries are shredded and formed into biscuits prior to finish baking.

The term "half product" is sometimes used equivalently in the art to the term cereal pellets but more frequently connotes an unpuffed piece to be puffed by deep fat frying to form a puffed snack. While R-T-E cereal pellets and snack half products have differences, each generally are fabricated from farinaceous cooked cereal doughs. Cereal pellets are generally smaller in size and often comprise higher amounts of sucrose while snack half products are generally larger and have little or no sucrose.

During the course of fabrication of cereal pellets or snack half products, a common unit operation is tempering. The term "tempering" in a snack or breakfast cereal process denotes a unit operation different from the operation with the same name in other food processing processes, e.g., flour milling. In a snack or breakfast cereal process "tempering" usually follows a drying or cooling step and is the step of holding the pellets for an extended time period which allows the cooked grain mass or cereal pellets to equilibrate moisture within and among the particles. Proper moisture equilibration can be important to a wide variety of intermediate product or final product properties.

Tempering, for example, may be important to the flakability or shreddability of pellets in cereal piece shaping or other fabrication. Tempering can also be important to the puff volume of finished pieces or to the uniformity or evenness of puff. In other applications, tempering can be important to providing improved bowl life.

Tempering traditionally involved holding the pieces (pellets, cooked grain grits, snack half products, etc.) such as in a temper bin or on a belt for periods of up to 24 hours. With modern controlled-humidity dryers, tempering times can generally be reduced to a matter of hours. Unfortunately, these still relatively lengthy temper times require substantial capital investment in holding equipment and reduce manufacturing flexibility. While improvements in cereal processing have substantially reduced the time, expense and inconvenience of tempering, there is a continuing need for new and useful improvements in cereal processing to provide methods for moisture equilibration of cooked cereal pieces.

Still another problem in the cereal processing art involves, in particular, the preparation of puffed cereal products. Certain puffed R-T-E cereal products upon gun puffing exhibit defects in the homogeneity of body of the puffed cereal piece. For example, in the preparation of certain corn based spherical R-T-E cereal products, a significant percentage of the puffed cereal base may undesirably exhibit large voids or even hollow cores. These defects not only are visually undesirable but also adversely affect texture and bowl life. Increasing temper times prior to puffing can improve the puff properties of the finished product but increase the cost of preparation as well as create a throughput bottleneck in continuous cereal product manufacturing. In view of these deficiencies in the cereal processing art, it is an object of the present invention to provide new and better microwave tempering steps.

Another object of the present invention is to provide improved methods for tempering cereal pellets which reduce the need for lengthy temper holding times and the need for expensive temper holding equipment.

Another object of the present invention is to provide methods for tempering cereal pellets which are useful in the manufacture of a large variety of ready-to-eat cereal and cereal based snack products.

Still another object of the present invention is to provide methods for tempering cereal pellets which can be practiced with present cereal and snack product methods and facilities.

Still another object of the present invention is to provide tempering methods which improve the throughput of existing cereal and snack half product production facilities.

Another object of the present invention is to provide improved tempering methods for cereal pellet and snack half product processing which improves the expanded finished product properties.

Surprisingly, the above objectives can be realized and the present invention provides improvements to known cooked cereal processing methods. More specifically, the present invention provides improvements in the tempering of cooked cereal pieces by briefly exposing the piece to high intensity microwave fields.

SUMMARY OF THE INVENTION

In one method aspect, the present invention provides improved methods for tempering cooked cereal pieces. The methods comprise subjecting the cooked cereal pieces to a brief exposure to a high intensity microwave field.

The cooked cereal pieces can include 1) cooked cereal dough pellets such as are used to prepare puffed and unpuffed R-T-E cereals and snack half products. The cooked cereal pieces can also include 2) cooked cereal grits such as for the production of shredded whole wheat, 3) cooked corn cones such as for corn flakes, 4) cooked whole grains such as rice or wheat for puffed rice, wheat products, or other whole grain R-T-E cereal products.

The microwave field intensity is at least 90 V/cm. Exposure times are sufficient to heat the pieces to a temperature of at least 200° F. but less than temperatures which result in steam pressures within the pellets to initiate puffing. Typical exposure periods can range from about 10 to 25 seconds.

In another particular method aspect, the present invention resides in improved methods for the preparation of puffed R-T-E cereal products. These methods comprise the steps of A) providing a quantity of cooked cereal dough pellets, B) microwave tempering the pellets in an intense microwave field, and C) gun puffing the microwave tempered pellets. The resultant finished products exhibit improvements in the reduction of defective pieces as well as improvements in puff volume, texture and for R-T-E cereal embodiments, also longer bowl life.

In one product aspect, the present invention resides in intermediate cereal products including microwave tempered cereal pellets, grits and half products which upon subsequent puffing or other processing exhibit superior performance. In another product aspect, the present invention relates to finished cereal products which exhibit superior texture and eating qualities. Finished products include puffed R-T-E cereals and snacks as well as unpuffed R-T-E cereals such as flakes or shreds.

BRIEF DESCRIPTION OF THE DRAWING

FIGURE 1 depicts a schematic flow diagram of generalized cooked cereal processing showing a representative tempering step.

DETAILED DESCRIPTION OF THE INVENTION

In its method aspect, the present invention provides improved high intensity microwave tempering methods for cooked cereal pieces and to methods for preparing finished cereal products that include the microwave tempering step. In its product aspect, the present invention provides improved microwave tempered cooked cereal pieces including especially cereal pellets and snack half products as well as to improved finished cereal products.

Most broadly, the present methods include the essential steps of A) providing a quantity of discrete fresh cooked cereal pieces, B) microwave tempering the cooked cereal pieces, and C) forming the microwave tempered cereal pieces into finished cereal pieces. The present invention finds particular suitability for use in the preparation of R-T-E cereals and cereal based snack foods.

Reference is now made to FIG. 1 which depicts a generalized schematic flow diagram of the cereal processing methods of the present invention that include the present microwave tempering step. The flow diagram illustrates that a wide variety of techniques can be employed to practice the first essential step of providing cooked cereal pieces.

By way of example, in one variation a dry blend of cereal ingredients is well mixed and then combined with water and mixing with heat to cook or gelatinize the starchy component of the cereal composition. In certain embodiments upon further mixing the gelatinized or cooked cereal can be formed into a cooked farinaceous dough. A variety of well known cooking methods and equipment can be used to prepare a cooked cereal dough. For example, the wetted cereal blend can be processed in a cooker extruder or in a pressurized and agitated steam cooker each of which form a cooked cereal dough which in turn is fed to a cereal pellet forming extruder. In another embodiment, the cooking and dough forming steps are performed simultaneously in a high pressure, cooker extruder equipped (e.g., a single or twin screw) with a pellet-forming diehead. The cooked cereal dough pellets so formed typically range from about 10% to 30% moisture.

The pellets can then be dried to adjust the moisture content for further processing. After drying, the moisture content desirably ranges from about 10% to 18%.

In another variation, the cooked cereal pieces comprise cooked grains or fragments such as whole wheat berries or grits, corn cones, oat flakes, and the like, having a moisture content ranging from about 25% to 35%. After microwave tempering the cooked grains or fragments can be shaped, such as by flaking or shredding rolls to form shaped pieces which are then subjected to a heating step such as in a toaster or baking oven.

Of course, within this general outline of cereal processing, a wide variety of particular methods and variations can be used.

In FIG. 1, it can be seen that the present improved cereal processing methods essentially include the present microwave tempering methods intermediate such early cereal processing steps as provision of the cooked cereal pieces and finish steps as puffing, flaking, toasting or baking, etc.

In the present methods, the cooked cereal pieces, while "fresh," i.e., while still untempered or incompletely tempered, are microwave tempered. Thus, the present microwave tempering step can be practiced in full or partial substitution for conventional tempering steps. Of course, conventional tempering involves holding the pellets for desired tempering holding times. The term "fresh" is used herein to include both untempered or incompletely tempered cereal pieces and mixtures thereof.

The exposure of the cereal pieces to the high intensity microwave field is continued for sufficient time to obtain the moisture equilibration benefits taught herein. Of course, the particular exposure times will vary depending upon such factors as the cereal composition, the microwave performance characteristics of the equipment selected including its microwave field characteristics it develops, the microwave absorbing characteristics of the cereal composition, the quantity of pieces being processed at any time, the size of the pellets, moisture, etc. However, the treated cereal pieces can be readily tested for puffing, texture and other attributes to establish the particular conditions desired. More particularly, in preferred methods of complete microwave tempering, the present high intensity microwave tempering is continued for sufficient time periods or durations so, on the one hand, as to raise the cereal pieces from whatever their starting temperature to a temperature greater than 200° F. but, on the other hand, to a temperature no higher than so as to generate internal steam pressure sufficient to initiate puffing. Good results in terms of heating without initiating puffing generally are obtained when the cereal pieces are exposed for times ranging from about 5 to 30 seconds. Better results in terms of puffability and finished product homogeneity are obtained when exposure times range from about 10 to 25 seconds. For best results, exposure times desirably range from about 15 to 20 seconds. Generally, longer exposure times are selected when the pellets or cereal pieces are cooler and higher in moisture content.

Importantly, the present high intensity microwave exposure step is to be distinguished from microwave heating of the cereal base pieces in a conventional microwave oven. Microwave field intensity can be described, of course, in various ways. In the present invention, the microwave field intensity is described in a conventional manner as a voltage gradient in free space, e.g., volts per centimeter. A conventional microwave oven is characterized by a relatively low field intensity, i.e., about 10 to 20 V/cm and by a high degree of unevenness. For comparison, this field strength is about 3 to 10 (3× to 10×) times greater than achieved in a conventional consumer microwave oven. Such high microwave field intensity can in turn involve high power dissipated in the product (>100 w/g of product). In contrast, in a conventional microwave oven, as the unit's rated power increases, generally the unit's cavity size also increases so that the field strength remains relatively constant. This power density feature is important not only so that the operating/cooking performance remains relatively uniform regardless of cavity size but also to prevent premature burn-out of the magnetron by reverse channeling or microwave reflection through the wave guide.

In the present invention, the cooked cereal pieces are desirably subjected to a high intensity microwave field. The conventional microwave field intensity is greater than 90 V/cm (as measured by a Luxtron Model MEF-1.5 Microwave E-Field Probe, available from Luxtron Corp., Mountain View, Calif.), preferably about 110 to 350 V/cm and more preferably about 125 to 300 V/cm, or in preferred embodiments between about 6 to 10 (6× to 10×) times as great as a conventional microwave oven. Also, it is highly preferred to use higher microwave frequencies. Thus, between the two presently licensed MW frequencies, higher frequencies importantly give more uniformity in field strength which in turn can result in greater uniformity in the finished product. The 2450 MHz frequency is preferred to the 915 MHz.

Additionally, the present microwave step preferably employs a highly uniform microwave field. By highly uniform herein is meant that the variation in field uniformity throughout the microwave heater's cavity is less than 15% if measured by a microwave sensitive diode.

Microwave equipment that can provide the desired field strength is commercially available. Useful herein for practicing the present methods are industrially sized microwave ovens from Cober Electronics, Inc. and, more preferably, from APV Baker, Inc. (See GB 2,193,619A by R. J. Meredith and John Milton.) Minor modifications to the equipment may be required to adapt the equipment from a known application, e.g., rubber curing, to the sanitary standards that are conventional for food processing.

The useful microwave tempered intermediate product cereal pieces thus formed can be thereafter processed in a wide variety of finishing steps to form finished cereal products. As indicated above, the present invention finds utility for use in connection with the preparation of a wide variety of R-T-E cereal products. For example, if a flake type cereal product is desired, the pellets or pieces are flaked so as to produce flakes of desired flake thickness which generally is in the range of 0.015 to 0.020 inch. Generally, these thin flakes are then tenderized to enhance their crispness and tenderness. A flake cereal is usually tenderized, toasted and partially expanded by rapid heating which converts the dense, hard flakes into more palatable, porous, tender flakes. A toasting operation after microwave tempering is generally employed to enhance the color and flavor of the finished cereal product. Toasting is accomplished by heating the flakes, usually to 200° to 400° F. (93.3° to 204.4° C.).

In another variation, if a puffed R-T-E cereal product is desired, the finishing steps can comprise puffing, e.g., gun puffing or in a fluidized bed heated with hot air such as a Jet Zone½ (Wolverine Corp.) puffed to form puffed pieces which may then include a sugar coating step.

In another variation, half products having a moisture content of about 10% to 14% can be fed to conventional puffing fryers to form puffed fried snacks.

In still another variation, cooked cereal grains or pieces can be microwave tempered, shredded to form shreds or shredded biscuits and then baked to form a shredded R-T-E cereal.

Surprisingly, it is an advantage of the present invention that microwave tempered cereal pellets for puffed cereals upon subsequent conventional gun puffing result in puffed finished products exhibiting superior puff characteristics. The superior puff characteristics include greater uniformity and homogeneity of the body of the puffed cereal piece with greatly reduced numbers of hollow centers and/or voids. Also, the eating texture is improved by having fewer tough shelled/hollow centered pieces. Additionally, the bowl life of the R-T-E cereal is improved due to the better uniformity and structure of the pores or voids in the cereal piece. Furthermore, puff volumes are improved giving a desirably lighter texture product. When microwave tempered, the finished puffed pieces exhibit greater uniformity.

The present invention also finds particular suitability for use for cereal pellets designed to provide complex (i.e., a "non-convex" shape) shapes upon subsequent puffing. Useful shapes, for example, include rings, stars, figures of objects, e.g., cars, wagon wheels, animals and people, and other non-convex shapes, especially those having multiple projections, e.g., a star. A convex shape is a mathematical definition defining an object where, for any two points in the object, all points on a straight line connecting the two points lie within the object (e.g., a sphere, ovoid, ellipsoid, etc.). Such shapes are difficult to puff evenly by conventional preparation methods.

The present invention finds particular suitability for use in connection with pellets for a puffed R-T-E cereal fabricated from corn based cooked cereal dough. In this particular embodiment, the cereal dough essentially comprises (dry weight basis):

| Ingredient | Weight % |
| --- | --- |
| Corn meal | 40-90%, preferably 75-85% |
| Wheat starch | 0.1-20%, preferably 2.5-7.5% |
| Supplemental flour | 0.1-40%, preferably 0.5-15% |
| Salt | 0.1-2.5%, preferably 1-2.5% |
| Sugar(s) | 0.1-10%, preferably 0.3-7% |

The supplemental or second flour can be any conventional flour type including oat flour, corn flour, wheat flour, barley flour, defatted soy flour, rice flour, and mixtures thereof. Preferred for use due to its bland flavor and color is oat flour.

The above cereal composition is then formed into cooked cereal dough pellets, especially spheres, microwave tempered and then gun puffed to form the puffed finished R-T-E cereal or cereal base. The puffed cereal base can optionally be sugar coated.

The finished puffed product is essentially characterized as a quantity of puffed cereal base pieces having no more than 20% thereof, having a hollow center greater than $\frac{1}{4}$R where R is the minimum radius of the cereal piece and at least 35% exhibiting no discrete void. In contrast, products prepared according to conventional methods can have as many as 60% of the pieces having a hollow center.

More generally speaking, in highly preferred embodiments of the present invention, the R-T-E pieces additionally include a flavor coating such as a presweetening coating. Well known compositions and presweetener coating application techniques can be employed both for sugar coating or when various high potency sweeteners, e.g., aspartame, acetylsulfame K, etc. In more preferred embodiments, the sugar coating solution additionally comprises a flavor constituent (often a fat soluble flavor dissolved in an oil carrier), and optionally, vitamins and minerals. The addition of a flavor constituent to the sugar coating solution is preferred due to flavor losses that can occur from the frying, toasting or puffing steps practiced herein. These steps, due to their heat application, tend to drive off the volatile flavor constituents leading to flavor degradation or loss. The coating can also include particulates such as fruit and nut pieces and/or small cereal grain flakes and mixtures thereof. The coating step can be practiced in known manner to evenly coat the exterior of the cereal base or to be selectively deposited in recesses thereof.

In the production of presweetened as well as flavored or bit coated, the puffed pieces are charged directly to an enrober at their exiting 6% moisture content. The pieces are sugar coated and then subjected to a drying step. As part of the drying operation, the moisture content is reduced to the required 3% levels.

INDUSTRIAL APPLICABILITY

The present invention is particularly suited for the commercial scale preparation of ready-to-eat cereal products.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the R-T-E cereal art, can be undertaken without departing from the spirit and scope of the invention.

EXAMPLE 1

A quantity of pellets for a puffed R-T-E cereal were provided having the following formulation:

| Ingredient | Weight % (Dry Basis) |
| --- | --- |
| Corn meal | 81.3 |
| Oat flour | 10.8 |
| Wheat starch | 5.0 |
| Trisodium phosphate | 0.2 |
| Calcium carbonate | 0.3 |
| Salt | 2.1 |
| Dextrose | 0.3 |

The pellets had a pellet count of 100–110 pellets per 10 g.

The pellets were dried to 10% moisture and immediately cooled with forced cold air to room temperature. The cooled pellets were immediately tempered in a microwave heating unit with 12 KW of power for 17 seconds at a feed rate of 0.4 lbs.m/in to form microwave tempered pellets. The microwave field density was about 290 V/cm. When subsequently gun puffed, the finished puffed R-T-E cereal product had a better, more even internal void structure with smaller voids and fewer hollow centers. The expansion was six-fold (6×).

EXAMPLE 2

A quantity of multi-grain pellets for a puffed R-T-E cereal were provided having the following formulation:

| Ingredient | Weight % (Dry Basis) |
| --- | --- |
| Corn cones | 48.0 |
| Wheat flour | 20.0 |
| Oat flour | 15.0 |
| Wheat starch | 7.5 |
| Sugar | 7.0 |
| Salt | 1.9 |
| Calcium carbonate | 0.3 |
| Trisodium phosphate | 0.3 |

The pellet count was about 100 per 10 g.

Multi-grain pellets were oblong in shape. The pellets were dried to a moisture content of 10% and cooled to room temperature. Immediately thereafter they were tempered at 7 KW for 18 seconds at 2 lb/min in a microwave unit available from Cober Electronics (Model No. CV124-18) operating at a frequency of 2450 MHz and for 30 seconds at 7 KW and 2 lb/min. The microwave field intensity was about 160 V/cm. Both the 18 and 30 second samples gave volumes of about 360 g/130 in$^3$ after puffing vs. 400 g/130 in$^3$ for untempered pellets after puffing. Such a difference in puff volume demonstrates the advantage in the final product resulting from the high intensity microwave tempering step.

EXAMPLE 3

A quantity of pellets prepared as described in Example 1 were provided. The pellets were microwave tempered immediately after having been dried and cooled to room temperature. The pellets were fed to a high intensity microwave heating unit available from Cober Electronics described in Example 2. The unit was set to provide 7.5 KW of microwave power. The pellets were fed at a rate of 4.4 lbs/min and were microwave tempered for an average residence time of 21 seconds. The field intensity was about 90 V/cm. exiting the microwave unit, the pellets were measured to have a temperature of about 206° F.

Subsequently, the microwave tempered pellets were gun puffed to provide a 6× increase in volume to form puffed finished R-T-E cereal pieces. The puffed pieces exhibited a better interior texture in terms of the voids being smaller in size and number relative to puffed pieces prepared with untempered pellets.

EXAMPLE 4

A quantity of pellets prepared as described in Example 1 were provided. The pellets were microwave tempered immediately after having been dried and cooled to room temperature. The pellets were fed to a high intensity microwave heating unit available from APV Baker, having an adjustable power up to 13.5 KW. The unit was set to provide 9 KW of microwave power. The microwave field intensity was about 100 V/cm. The pellets were fed at a rate of 4.2 lbs/min and were microwave tempered for an average residence time of 22 seconds. Upon exiting the microwave unit, the pellets were measured to have a temperature of about 207° F.

Subsequently, the microwave tempered pellets were gun puffed to provide a 6× increase in volume to form puffed finished R-T-E cereal pieces. The puffed pieces exhibited a better interior texture in terms of the voids being smaller in size and number. Moreover, the finished pieces exhibited better texture in terms of bowl life upon consumption.

What is claimed is:

1. A method for tempering a cooked cereal piece comprising the step of:
 exposing a quantity of fresh cooked cereal pieces having a moisture content to a high intensity microwave field for a time duration sufficient to evenly distribute the moisture content without steam pressure generation within the piece and wherein the microwave field is greater than 90 V/cm.

2. The method of claim 1
 wherein the cooked cereal piece is selected from the group consisting of a) cooked cereal dough pellets, b) cereal whole grains, c) cereal grain fragments, and d) mixtures thereof.

3. The method of claim 2
 wherein the time duration is sufficient to raise the temperature of the cereal piece to greater than 200° F. without puffing.

4. The method of claim 3
 wherein the cereal piece has a moisture content of about 8% to 14% by weight.

5. The method of claim 4
 wherein the time duration ranges from about 15 to 30 seconds and wherein the microwave field strength ranges from about 125 to 300 V/cm.

6. The method of claim 5
 where the cereal piece is a cooked cereal dough pellet.

7. The method of claim 5
 wherein the cereal grain fragments are selected from the group consisting of flakes, grits, cones and berries.

8. The method of claim 7
 wherein the cereal grain fragments are selected from the group consisting of wheat, corn, rice, oats, rye, barley, triticale and mixtures thereof.

9. The method of claim 6
 wherein the cooked cereal dough comprises whole wheat.

10. The method of claim 6
 wherein the cooked cereal dough comprises oats.

11. A method for preparing a finished cereal product exhibiting superior organoleptic attributes, comprising the steps of:

A. providing a quantity of fresh cooked cereal pieces having a moisture content ranging from about 8% to 14% by weight;

B. microwave tempering the cooked cereal pieces in a microwave field having a field strength of greater than 90 V/cm for a time sufficient to evenly distribute the moisture without steam pressure generation within the piece to form a microwave tempered cereal pellet; and C. forming the microwave tempered cereal pieces into a finished cereal product.

12. The method of claim 11
 wherein the cooked cereal piece is selected from the group consisting of a) cooked cereal dough pellets, b) cereal whole grains, c) cereal grain fragments, and d) mixtures thereof.

13. The method of claim 12
 wherein the microwave field is greater than 90 V/cm.

14. The method of claim 13
 wherein the time duration is sufficient to raise the temperature of the cereal piece to greater than 200° F. without puffing.

15. The method of claim 14
 wherein the cereal piece has a moisture content of about 8% to 14% by weight.

16. The method of claim 15
 wherein the time duration ranges from about 5 to 30 seconds and wherein the microwave field strength ranges from about 125 to 300 V/cm.

17. The method of claim 16
 wherein the cereal piece is a cooked cereal dough pellet having a non-convex shape.

18. The method of claim 17
 wherein the cereal grain fragments are selected from the group consisting of flakes, grits, cones and berries.

19. The method of claim 16
 wherein the cooked cereal pieces are cooked cereal dough pellets, and
 wherein in step C, the microwave tempered cereal pieces are formed into a finished cereal product by puffing the microwave tempered cereal pellet to form a puffed cereal piece.

20. The method of claim 19
 wherein the time in step B ranges from about 15 to 30 seconds.

21. The method of claim 20
 wherein the cooked cereal dough pellets have a pellet count ranging from about 50 to 150 per 10 g.

22. The method of claim 21
 wherein the puffing step comprises gun puffing the microwave tempered cereal pellet.

23. The method of claim 22
 wherein the cooked cereal dough pellets comprise a cereal composition including (dry basis):
A. about 40% to 90% by weight of the cereal composition of corn meal or cones;
B. about 0.1% to 20% by weight of the cereal composition of wheat flour;
C. about 0.1% to 40% by weight of a second farinaceous material; and
D. about 0.1% to 10% by weight of salt.

24. The method of claim 23
 wherein the cooked cereal piece composition additionally comprises
E. about 0.1% to 10% by weight of a nutritive carbohydrate sweetening agent.

25. The method of claim 24 wherein the second farinaceous ingredient is starch, and wherein the nutritive carbohydrate sweetening agent is sucrose.

26. The method of claim 25
wherein the second farinaceous ingredient is wheat starch.

27. The method for preparing an unpuffed cereal piece exhibiting better textural homogeneity comprising the steps of:
   A. providing a quantity of cooked cereal pieces having a moisture content ranging from about 8% to 20% by weight;
   B. microwave tempering the cooked cereal pieces in a microwave field having a field strength of greater than 90 V/cm for a time sufficient to evenly distribute the moisture without steam pressure generation within the piece to form a microwave tempered cereal pellet;
   C. shaping the microwave tempered cereal pellets to form shaped cereal pieces; and
   D. finish drying the shaped cereal pieces to form finished cereal pieces.

28. The method of claim 27
wherein the cooked cereal pieces are selected from the group consisting of a) cooked cereal dough pellets, b) cereal whole grains, c) cereal grain fragments, and d) mixtures thereof, and wherein the shaping step comprises shredding the cooked cereal pieces to form a shredded cereal, and wherein the finish drying step comprises baking the shredded cereal to form a dried shredded R-T-E cereal.

29. The method of claim 28
wherein the time in step B ranges from about 15 to 30 seconds and wherein the microwave field strength ranges from about 125 to 300 V/cm.

30. The method of claim 29 additionally comprising the step of forming the shredded cereal into biscuit pieces.

31. The method of claim 30 wherein the cereal comprises whole wheat or oats.

32. The method of claim 31
wherein the cereal comprises whole wheat.

33. The method of claim 27
wherein the cooked cereal pieces are cooked cereal dough pellets, wherein step C comprises flaking the pellets to form flakes, and wherein step D comprises toasting the pellets to form toasted finished R-T-E cereal flakes.

34. The method of claim 32
wherein the cereal pellets comprise cooked whole wheat cereal dough pellets.

35. The method of claim 33
wherein the cereal pellets comprise cooked oat cereal dough pellets.

* * * * *